United States Patent
Kim et al.

(10) Patent No.: US 10,850,251 B2
(45) Date of Patent: Dec. 1, 2020

(54) RADIOACTIVE CESIUM ADSORBENT AND METHOD OF REMOVING RADIOACTIVE CESIUM USING THE SAME

(71) Applicants: KOREA ATOMIC ENERGY RESEARCH INSTITUTE, Daejeon (KR); Daegu Gyeongbuk Institute of Science and Technology, Daegu (KR)

(72) Inventors: Hyuncheol Kim, Sejong-si (KR); Soonhyun Kim, Daejeon (KR); Minsun Kim, Cheongdo-gun (KR); Sang Kyoo Lim, Daegu (KR); Wanno Lee, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 16/189,840

(22) Filed: Nov. 13, 2018

(65) Prior Publication Data
US 2020/0027615 A1    Jan. 23, 2020

(30) Foreign Application Priority Data

Dec. 28, 2017  (KR) .................. 10-2017-0182914
Aug. 31, 2018  (KR) .................. 10-2018-0103976

(51) Int. Cl.
*B01J 19/12*   (2006.01)
*C02F 1/28*    (2006.01)
(Continued)

(52) U.S. Cl.
CPC ............ *B01J 19/123* (2013.01); *B01J 23/06* (2013.01); *B01J 23/30* (2013.01); *B01J 23/626* (2013.01);
(Continued)

(58) Field of Classification Search
CPC ...... B01J 19/123; C01G 23/047; C07F 15/02; G21F 9/12; C02F 1/281
See application file for complete search history.

(56) References Cited

U.S. PATENT DOCUMENTS 3,296,123 A * 1/1967 Prout .................. B01J 39/09
                                                       210/670
4,448,711 A * 5/1984 Motojima ............... G21F 9/12
                                                       210/502.1
(Continued)

FOREIGN PATENT DOCUMENTS

JP    2014-1991 A    1/2014
JP    2014-016211 A  1/2014
(Continued)

OTHER PUBLICATIONS

Derwent abstract of JP-2015014594 (Year: 2015).*
(Continued)

*Primary Examiner* — Nicholas A Smith
*Assistant Examiner* — Colleen M Raphael
(74) *Attorney, Agent, or Firm* — Lex IP Meister, PLLC (57) ABSTRACT

A radioactive cesium adsorbent includes photocatalyst particles and Prussian blue. The ferric ions of the Prussian blue are reduced to ferrous ions by activation of the photocatalyst particles. A method of removing radioactive cesium using the radioactive cesium adsorbent includes preparing a composition comprising photocatalyst particles and Prussian blue; preparing a precursor solution by mixing radioactive cesium and the composition prepared in the preparing of a composition; and reducing ferric ions of the Prussian blue to ferrous ions by activating the photocatalyst particles in the precursor solution prepared in the preparing of a precursor solution.

8 Claims, 8 Drawing Sheets

(51) Int. Cl.
*G21F 9/12* (2006.01)
*C07F 15/02* (2006.01)
*C01G 23/047* (2006.01)
*B01J 23/30* (2006.01)
*B01J 23/62* (2006.01)
*B01J 23/745* (2006.01)
*B01J 23/06* (2006.01)

(52) U.S. Cl.
CPC .......... *B01J 23/745* (2013.01); *C01G 23/047* (2013.01); *C02F 1/281* (2013.01); *C07F 15/02* (2013.01); *G21F 9/12* (2013.01)

(56) References Cited

U.S. PATENT DOCUMENTS

| | | | | |
|---|---|---|---|---|
| 5,730,884 | A * | 3/1998 | Kikuchi | C02F 1/32 210/748.09 |
| 5,989,434 | A * | 11/1999 | Lundquist | B01J 20/3007 210/679 |
| 6,090,291 | A * | 7/2000 | Akai | A62D 3/20 210/188 |
| 6,121,507 | A * | 9/2000 | Kim | C02F 1/28 204/157.15 |
| 2006/0144793 | A1 * | 7/2006 | Dadachov | C01G 23/04 210/660 |
| 2008/0145448 | A1 * | 6/2008 | Pahuja | A61K 33/10 424/608 |
| 2009/0112042 | A1 * | 4/2009 | Chung | G21F 9/004 588/6 |
| 2013/0161260 | A1 * | 6/2013 | Ferguson | C02F 1/42 210/682 |
| 2013/0237741 | A1 * | 9/2013 | Sekine | B09C 1/08 588/1 |
| 2014/0042068 | A1 * | 2/2014 | Namiki | G21F 9/12 210/222 |
| 2014/0194665 | A1 * | 7/2014 | Ishii | G21F 9/12 588/6 |
| 2014/0231353 | A1 * | 8/2014 | Ohnishi | G21F 9/06 210/663 |
| 2014/0235916 | A1 * | 8/2014 | Hanada | G21F 9/12 588/6 |
| 2014/0346115 | A1 * | 11/2014 | Namiki | G21F 9/12 210/682 |
| 2015/0239758 | A1 * | 8/2015 | Namiki | C02F 1/488 210/695 |

FOREIGN PATENT DOCUMENTS

| | | | |
|---|---|---|---|
| JP | 2014077162 A | * | 5/2014 |
| JP | 2015-14594 A | | 1/2015 |
| JP | 2015014594 A | * | 1/2015 |
| JP | 2015-211816 A | | 11/2015 |
| JP | 2016-035435 A | | 3/2016 |
| JP | 2016-523688 A | | 8/2016 |
| WO | 2018/011525 A1 | | 1/2018 |

OTHER PUBLICATIONS

Machine translation of JP-2015014594 description (Year: 2015).*
Soonhyun Kim et al., Abstract—"Prussian Blue Deposited TiO2 for Effective Cesium Removal", The 22nd International Conference on Semiconductor Photocatalysis and Solar Energy Conversion (SPASEC-22)—17 page (Nov. 13, 2017).
Office Action of corresponding Japanese Patent Application No. 2018-202895—4 pages dated Dec. 3, 2019.
Office Action of corresponding Korean Patent Application No. 10-2018-0103976—5 pages dated Feb. 13, 2020.

* cited by examiner

FIG. 8B ents pages# RADIOACTIVE CESIUM ADSORBENT AND METHOD OF REMOVING RADIOACTIVE CESIUM USING THE SAME

CROSS-REFERENCE TO RELATED APPLICATION

This application claims priority to and the benefit of Korean Patent Application No. 2017-0182914, filed on Dec. 28, 2017 and Korean Patent Application No. 2018-0103976, filed on Aug. 31, 2018, the disclosure of which is incorporated herein by reference in its entirety.

STATEMENT REGARDING PRIOR DISCLOSURES BY THE INVENTOR OR A JOINT INVENTOR UNDER 37 CFR 1.77(B)(6)

The joint inventors, Soonhyun Kim, Minsun Kim, Hyuncheol Kim and Wanno Lee, provided a presentation on "Prussian Blue Deposited $TiO_2$ for Effective Cesium Removal" on Nov. 13, 2017 in the $22^{nd}$ International Conference on Semiconductor Photocatalysis and Solar Energy Conversion. The abstract of the presentation on "Prussian Blue Deposited $TiO_2$ for Effective Cesium Removal" is submitted with an Information Disclosure Statement along with this application.

BACKGROUND

1. Field

The present disclosure relates to a radioactive cesium adsorbent using activation of photocatalyst particles and a method of removing radioactive cesium using the same.

2. Discussion of Related Art

Prussian blue (or ferrocyanide) has been used as a dye for a long time. The IAEA and the FDA have reported that $^{137}Cs$ may be removed from the body by ingesting Prussian blue, based on the fact that Prussian blue is highly adsorbed to $^{137}Cs$ and Prussian blue is not toxic. Thus, use of Prussian blue as a radioactive cesium adsorbent has long been known, and techniques associated therewith depend on the type of carrier that carries Prussian blue. Japanese Patent Application Publication No. 2015-211816 (Nov. 26, 2015) discloses the related technology.

SUMMARY

One aspect of the present disclosure provides a radioactive cesium adsorbent capable of effectively removing radioactive cesium and including photocatalyst particles and Prussian blue, wherein the ferric ions of the Prussian blue are reduced to ferrous ions by activation of the photocatalyst particles.

In accordance with the present disclosure, the above and other aspects can be accomplished by providing a radioactive cesium adsorbent including photocatalyst particles and Prussian blue, wherein the ferric ions of the Prussian blue are reduced to ferrous ions by activation of the photocatalyst particles.

The above and other aspects also provide a method of removing radioactive cesium including step (a) of preparing a composition including photocatalyst particles and Prussian blue; step (b) of preparing a precursor solution by mixing the composition prepared in step (a) and radioactive cesium; and step (c) of reducing the ferric ions of the Prussian blue to ferrous ions by activating the photocatalyst particles in the precursor solution prepared in step (b).

BRIEF DESCRIPTION OF THE DRAWINGS

The above and other aspects, features and advantages of the present disclosure will become more apparent to those of ordinary skill in the art by describing embodiments thereof in detail with reference to the accompanying drawings, in which.

DETAILED DESCRIPTION OF EMBODIMENTS

Recently, a technique for recovering $^{137}Cs$ using an adsorbent prepared by combining magnetic nanoparticles and Prussian blue and a technology for recovering $^{137}Cs$ using Prussian blue supported on a nanofiber have been developed. These technologies depend on a method of carrying Prussian blue on a carrier and the composition of a Prussian blue-carrier complex.

Technologies using Prussian blue focuses on 1) Prussian blue-carrying methods, 2) carrier type, and 3) absorption and recovery of $^{137}$Cs using a carrier carrying Prussian blue. However, research on utilization of Prussian blue adsorbed on $^{137}$Cs has not yet been conducted.

Meanwhile, according to a photocatalyst technology, a photocatalyst absorbs light to generate a strong oxidizing agent such as hydroxyl radicals, thereby photodecomposing various non-degradable organic pollutants. In this case, photocatalysts that can be used in the above photocatalyst technology include semiconductor oxides such as $TiO_2$, $ZnO$, $WO_3$, and $SnO_2$.

The present inventors have studied a radioactive cesium adsorbent using Prussian blue. During the study, it was confirmed that radioactive cesium was effectively/selectively removed when activated photocatalyst particles were used to improve the performance of Prussian blue. Based on these results, the present disclosure was completed.

Hereinafter, the present disclosure will be described in detail.

Radioactive Cesium Adsorbent

The present disclosure relates to a radioactive cesium adsorbent including photocatalyst particles and Prussian blue, wherein the ferric ions of the Prussian blue are reduced to ferrous ions by activation of the photocatalyst particles.

That is, photocatalyst particles and Prussian blue may be included in the radioactive cesium adsorbent according to the present disclosure in a mixed state or in a state wherein the photocatalyst particles are coated with Prussian blue or Prussian blue is carried on the photocatalyst particles.

In a state wherein the photocatalyst particles are not activated, the radioactive cesium adsorbent may act as a precursor for adsorbing radioactive cesium. When Prussian blue is mixed with radioactive cesium, radioactive cesium may be primarily adsorbed to Prussian blue. In addition, in a state wherein the photocatalyst particles are activated, the ferric ions of Prussian blue are reduced to ferrous ions. When the radioactive cesium adsorbent in this state and radioactive cesium are mixed, radioactive cesium may be secondarily adsorbed to the radioactive cesium adsorbent.

First, the radioactive cesium adsorbent according to the present disclosure includes photocatalyst particles. Up to now, a method of mixing Prussian blue and magnetic nanoparticles or a nanofiber or carrying Prussian blue on magnetic nanoparticles or a nanofiber has been studied. However, a method using photocatalyst particles has not been studied.

The photocatalyst particles may include one or more selected from the group consisting of $TiO_2$, $ZnO$, $WO_3$, $SnO_2$, $CdS$, and $Fe_2O_3$. Thereamong, since $TiO_2$ shows a significant photochemical reaction-promoting efficiency, $TiO_2$ particles are preferably used as the photocatalyst particles, without being limited thereto. On the other hand, $SiO_2$ particles are in an oxide form, but are excluded because $SiO_2$ particles may not be regarded as photocatalyst particles. In addition, the photocatalyst particles preferably have a diameter of 5 to 100 nm, without being limited thereto.

In addition, the photocatalyst particles are activated by UV light within a wavelength range within which the photocatalyst particles are activated and then promote a photochemical reaction. The activated photocatalyst particles may react with water to form OH radicals and hydrogen ions, and may reduce the ferric ions of Prussian blue described below to ferrous ions. In this case, the wavelength range within which the photocatalyst particles are activated is preferably more than 300 nm, more preferably more than 300 nm and less than or equal to 500 nm, without being limited thereto. In this case, when the wavelength is 300 nm or less, the energy required is excessively increased due to a very short wavelength. When the wavelength is more than 500 nm, the photocatalyst particles may not be activated.

Specifically, in the present disclosure, $TiO_2$ particles are used as the photocatalyst particles. Since the $TiO_2$ particles have a band gap of 3.0 to 3.2 eV, UV light within a wavelength range of 300 nm or more, preferably 380 to 420 nm, more preferably 390 to 410 nm, is used to overcome this band gap and to activate the $TiO_2$ particles. Then, the activated $TiO_2$ particles may promote a photochemical reaction.

More specifically, in the present disclosure, a reaction mechanism for activating $TiO_2$ particles and a mechanism for promoting a photochemical reaction by activated $TiO_2$ particles are shown in (1) to (3) below:

$$TiO_2 + h\nu(\lambda > 300 \text{ nm}) \rightarrow e^- + h^+ \quad (1)$$

$$h^+ + H_2O \rightarrow OH + H^+ \quad (2)$$

$$e^- + (\text{-}[Fe(III)\text{-}CN\text{-}Fe(II)]\text{-}) \rightarrow (\text{-}[Fe(II)\text{-}CN\text{-}Fe(II)]\text{-}) \quad (3)$$

Next, the radioactive cesium adsorbent according to the present disclosure includes Prussian blue. Prussian blue may be simply mixed with the photocatalyst particles. Alternatively, the photocatalyst particles may be coated with Prussian blue, or Prussian blue may be carried on the photocatalyst particles.

The ferric ions of Prussian blue are reduced to ferrous ions by activation of the photocatalyst particles.

Prussian blue refers to a substance denoted as $Fe_7(CN)_{18}$ and exhibiting a deep blue color. In addition, Prussian blue may include ferric ions, and may be a compound represented by Formula 1:

Formula 1

In this case, Prussian blue may be prepared by adding iron chloride to a solution of a ferrocyanide salt (sodium ferrocyanide, potassium ferrocyanide, ammonium ferrocyanide, or the like). Prussian blue, a chelating agent, may be used as an emergency medicine when contaminated with $^{137}$Cs, a radioactive element. Prussian blue may shorten the biological half-life of $^{137}$Cs from 110 to 30 days. Prussian blue has high selectivity for radioactive cesium among various radioactive materials, and has an excellent radioactive cesium adsorption rate (removal rate).

Figure 1:
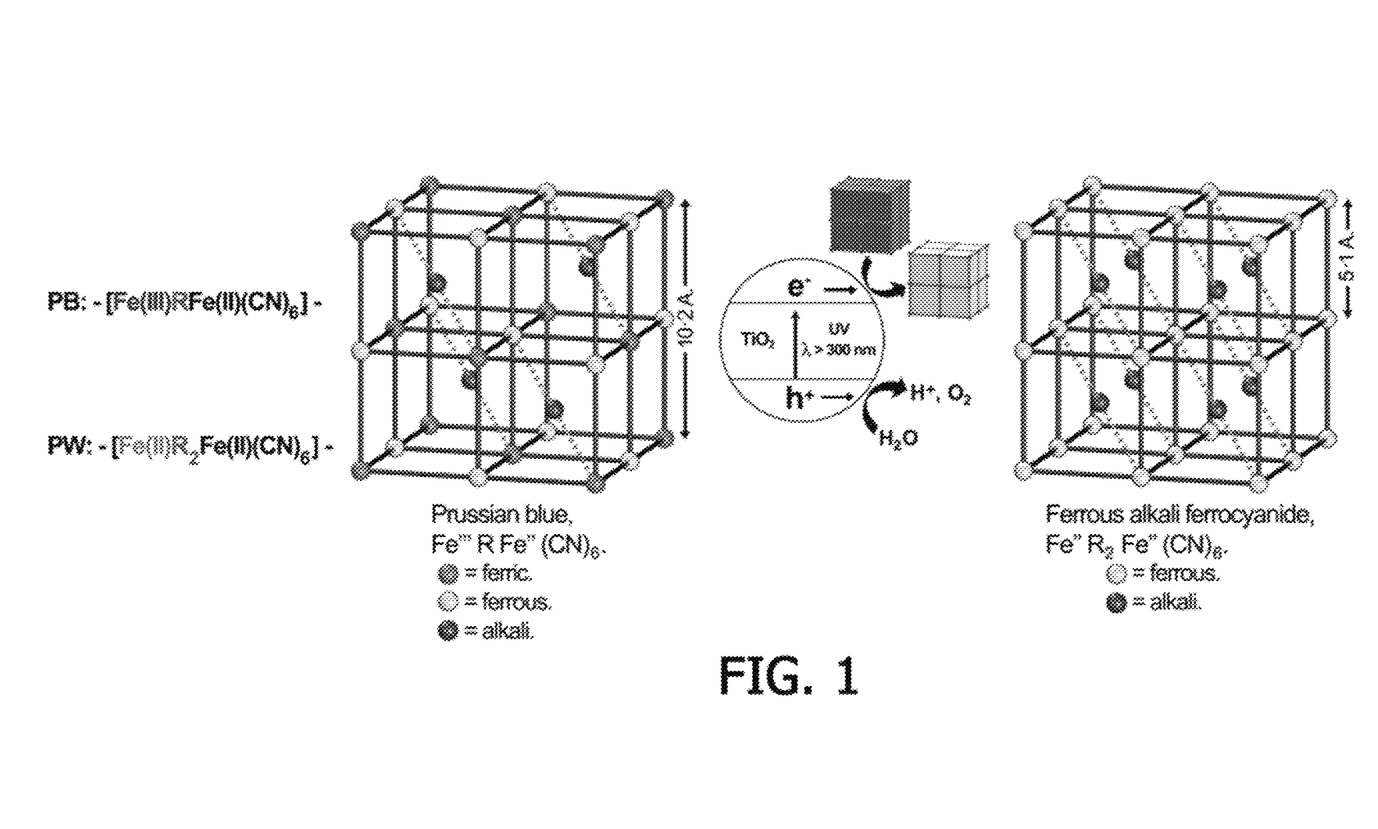
FIG. 1 is a diagram showing a mechanism by which the ferric ions of Prussian blue are reduced to ferrous ions.

The ferric ions of Prussian blue are reduced to ferrous ions by activation of the photocatalyst particles (specifically, the photocatalyst particles are activated by UV light within a wavelength range within which the photocatalyst particles are activated). As a result of the reduction reaction, the performance of Prussian blue may be further improved. The mechanism for the reduction reaction is shown in FIG. 1.

The wavelength range within which the photocatalyst particles are activated is preferably more than 300 nm, more preferably more than 300 nm and less than or equal to 500 nm, without being limited thereto. In this case, the UV light within the wavelength range may be radiated from the outside for 10 minutes to 10 hours, and the total amount of radiation of the external UV light per hour may be 300 to 5,000 $mJ/cm^2$.

In addition, the external UV radiation may be performed at pH 2 to pH 10. As the pH value increases, the surface charge of samples becomes negative, so that radioactive cesium may be removed more effectively/selectively.

In addition, the external UV radiation is preferably performed under a nitrogen atmosphere, without being limited thereto. On the other hand, when external UV radiation is performed under an oxygen atmosphere, since the ferric ions of Prussian blue are not reduced by activation of the photocatalyst but oxygen is reduced, the performance of Prussian blue may not be improved.

In addition, depending on the shape of the photocatalyst particles, the radioactive cesium adsorbent may be prepared in various forms such as powder, a bead, a fiber, and a membrane. In particular, when the radioactive cesium adsorbent is prepared in the form of a fiber or a membrane, the radioactive cesium adsorbent may be easily recovered after adsorption and removal of radioactive cesium.

Method of Removing Radioactive Cesium

The present disclosure provides a method of removing radioactive cesium including step (a) of preparing a composition including photocatalyst particles and Prussian blue; step (b) of preparing a precursor solution by mixing the composition prepared in step (a) and radioactive cesium; and step (c) of reducing the ferric ions of the Prussian blue to ferrous ions by activating the photocatalyst particles in the precursor solution prepared in step (b).

Figure 2:
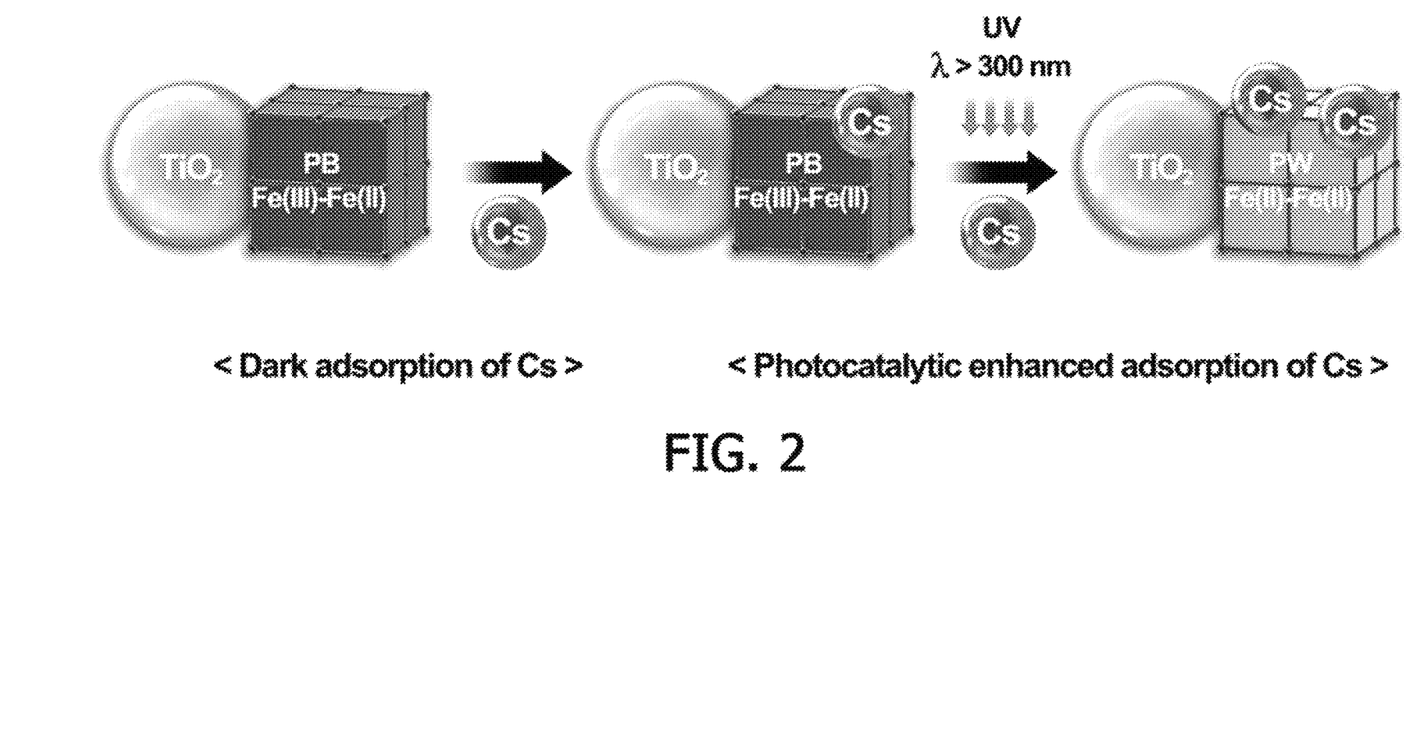
FIG. 2 is a schematic view illustrating a method of removing radioactive cesium according to one embodiment of the present disclosure.

FIG. 2 is a schematic view illustrating a method of removing radioactive cesium according to one embodiment of the present disclosure. As shown in FIG. 2, adsorption of radioactive cesium may be primarily performed by mixing the composition including the photocatalyst particles and Prussian blue and radioactive cesium. Then, the ferric ions of Prussian blue may be reduced to ferrous ions by activating the photocatalyst particles, and adsorption of radioactive cesium may be secondarily performed during this reduction process.

First, the method of removing radioactive cesium according to the present disclosure includes step (a) of preparing a composition including photocatalyst particles and Prussian blue.

Description of the photocatalyst particles and the Prussian blue is the same as described above, and thus will be omitted.

The composition may be prepared by mixing the photocatalyst particles and Prussian blue. The weight ratio of the photocatalyst particles to Prussian blue is preferably 1:10 to 10:1, without being limited thereto. In this case, when the content of Prussian blue is too low, adsorption and removal of radioactive cesium may not be effectively performed. When the content of Prussian blue is too high, activation of photocatalyst particles by UV may not be effectively performed.

Next, the method of removing radioactive cesium according to the present disclosure includes step (b) of preparing a precursor solution by mixing the composition prepared in step (a) and radioactive cesium. During this step, adsorption of radioactive cesium may be primarily performed.

The total concentration of the photocatalyst particles and Prussian blue contained in the precursor solution is preferably 2 to 20 g/L, more preferably 5 to 20 g/L, without being limited thereto. In this case, as the total concentration of the photocatalyst particles and Prussian blue contained in the precursor solution is increased, radioactive cesium may be more effectively removed according to the UV range.

Next, the method of removing radioactive cesium according to the present disclosure includes step (c) of reducing the ferric ions of Prussian blue to ferrous ions by activating the photocatalyst particles in the precursor solution prepared in step (b). During this step, adsorption of radioactive cesium may be secondarily performed.

The wavelength range within which the photocatalyst particles are activated is preferably more than 300 nm, more preferably more than 300 nm and less than or equal to 500 nm, without being limited thereto. In this case, the UV light within the wavelength range may be radiated from the outside for 10 minutes to 10 hours, and the total amount of radiation of the external UV light per hour may be 300 to 5,000 mJ/cm$^2$.

In addition, the external UV radiation may be performed at pH 2 to pH 10. As the pH value increases, the surface charge of samples becomes negative, so that radioactive cesium may be removed more effectively/selectively.

In addition, the external UV radiation is preferably performed under a nitrogen atmosphere, without being limited thereto. On the other hand, when external UV radiation is performed under an oxygen atmosphere, since the ferric ions of Prussian blue are not reduced by activation of the photocatalyst but oxygen is reduced, the performance of Prussian blue may not be improved.

Therefore, the radioactive cesium adsorbent according to the present disclosure includes photocatalyst particles and Prussian blue. The ferric ions of Prussian blue are reduced to ferrous ions by activation of the photocatalyst particles. Thus, the performance of Prussian blue may be improved, so that radioactive cesium may be effectively/selectively removed.

In particular, by optimizing external UV radiation conditions for activation of the photocatalyst particles, the performance of Prussian blue may be further improved, so that radioactive cesium may be more effectively/selectively removed.

According to the present disclosure, when the radioactive cesium adsorbent is used, the amount of secondary waste may be greatly reduced while radioactive cesium, which is regarded as a dangerous material in terms of radiation protection and environmental protection, is effectively removed. Therefore, the radioactive cesium adsorbent may be useful for decontamination or after accidents at nuclear facilities.

Hereinafter, the present disclosure will be described in more detail with reference to the following examples. These examples are provided for illustrative purposes only and should not be construed as limiting the scope and spirit of the present disclosure.

EXAMPLES

Example 1

1 g of TiO$_2$ powder (Sigma-Aldrich Co.) as the photocatalyst particles and 1 g of Prussian blue (CAS number: 14038-43-8, Sigma-Aldrich Co.) were mixed, and then water was added thereto, followed by additional mixing at 25° C. for 2 hours. Thereafter, the mixture was passed through a 0.45 μm filter and dried in an 80° C. oven to prepare a dried sample. Then, the sample and Cs were mixed to prepare an aqueous precursor solution containing the sample at a concentration of 0.5 to 10 g/L and Cs at a concentration of 40 to 55 μM.

Comparative Example 1

Cs was removed in the same manner as in Example 1, except that $SiO_2$ powder (Sigma-Aldrich Co.) was used instead of $TiO_2$ powder.

Experimental Example 1: Degree of Cs Removal (or Adsorption) Depending on Concentration of Sample in Aqueous Precursor Solution In the Cs removal according to Example 1, experiments were conducted to determine the degree of Cs removal (or adsorption) depending on the concentration of the sample in the aqueous precursor solution. The obtained results are shown in FIGS. 3A and 3B.

Figure 3A:
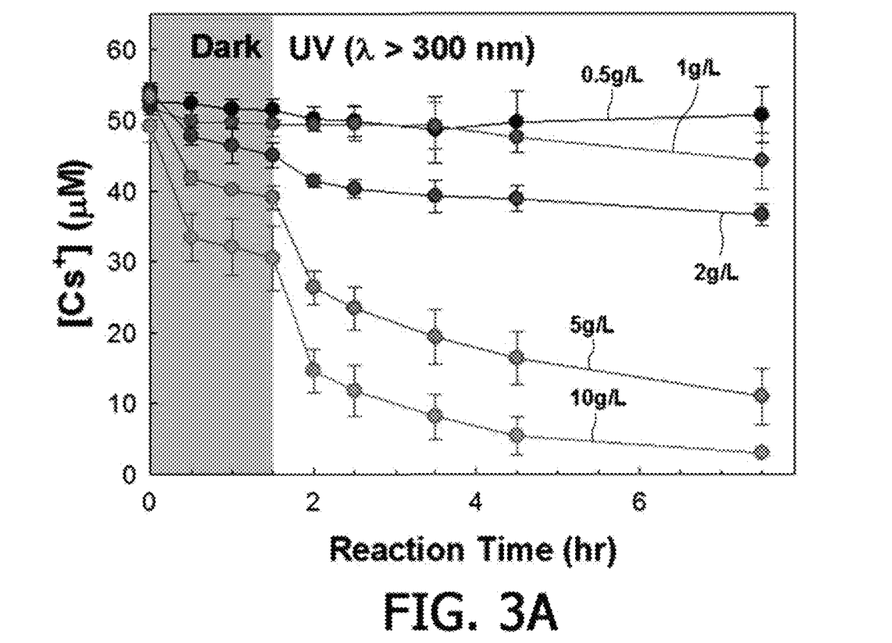
FIG. 3A is a graph showing the results of observing a change in Cs concentrations depending on the concentrations of samples in an aqueous precursor solution over time, in the Cs removal according to Example 1.

FIG. 3A is a graph showing the results of observing a change in Cs concentrations depending on the concentrations of samples in an aqueous precursor solution over time [not irradiated with external UV for 90 minutes, and then irradiated with external UV (amount of UV radiated per hour=3,000 $mJ/cm^2$)], in the Cs removal according to Example 1.

As shown in FIG. 3A, when the concentration of the sample in the aqueous precursor solution is 0.5 to 1 g/L, the degree of Cs removal is insignificant. When the concentration of the sample in the aqueous precursor solution is 2 g/L or more, that is, the concentration of the sample in the aqueous precursor solution is increased, the degree of Cs removal is increased. In particular, as external UV radiation time increases, the degree of Cs removal is significantly increased.

Figure 3B:
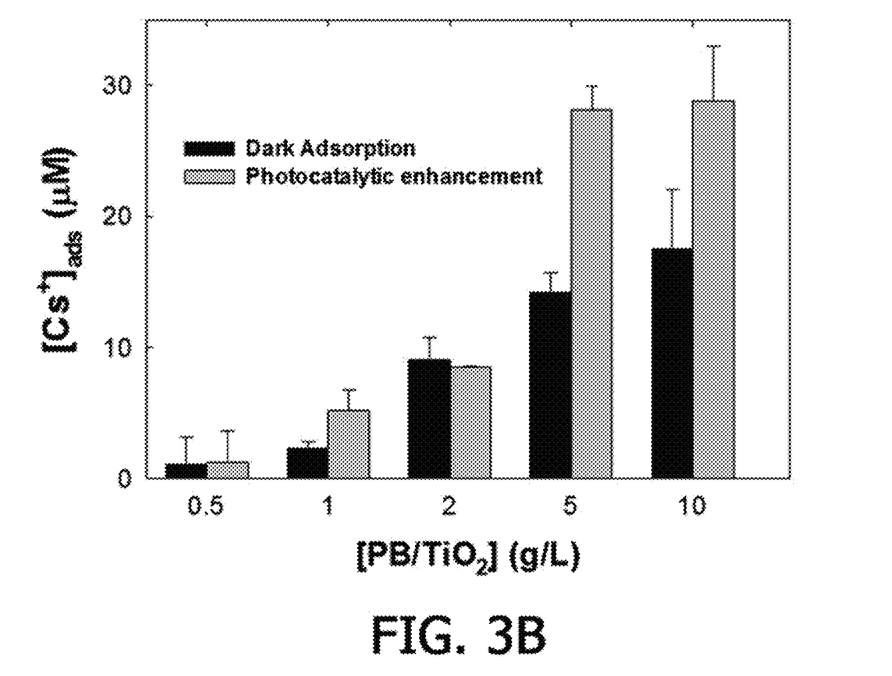
FIG. 3B is a graph showing the results of comparing Cs adsorption concentrations when not irradiated with external UV and Cs adsorption concentrations when irradiated with external UV for 6 hours depending on the concentrations of samples in an aqueous precursor solution, in the Cs removal according to Example 1.

FIG. 3B is a graph showing the results of comparing Cs adsorption concentrations when not irradiated with external UV and Cs adsorption concentrations when irradiated with external UV for 6 hours (amount of UV radiated per hour=3,000 $mJ/cm^2$) depending on the concentrations of samples in an aqueous precursor solution, in the Cs removal according to Example 1.

As shown in FIG. 3B, when the concentration of the sample in the aqueous precursor solution is 0.5 to 1 g/L, the degree of Cs adsorption is insignificant under both non-external UV radiation conditions and external UV radiation conditions. When the concentration of the sample in the aqueous precursor solution is 2 g/L or more, that is, the concentration of the sample in the aqueous precursor solution is increased, the degree of Cs adsorption is increased. In particular, when the concentration of the sample in the aqueous precursor solution is 5 g/L or more, compared with non-external UV radiation conditions, in the case of external UV radiation conditions, the degree of Cs adsorption is significantly increased.

Experimental Example 2: Degree of Cs Removal Depending on pH Conditions

In the Cs removal according to Example 1 and Comparative 1 (concentration of sample in aqueous precursor solution=5 g/L), experiments were conducted to determine the degree of Cs removal depending on pH conditions. The obtained results are shown in FIG. 4 and FIGS. 5A and 5B.

Figure 4:
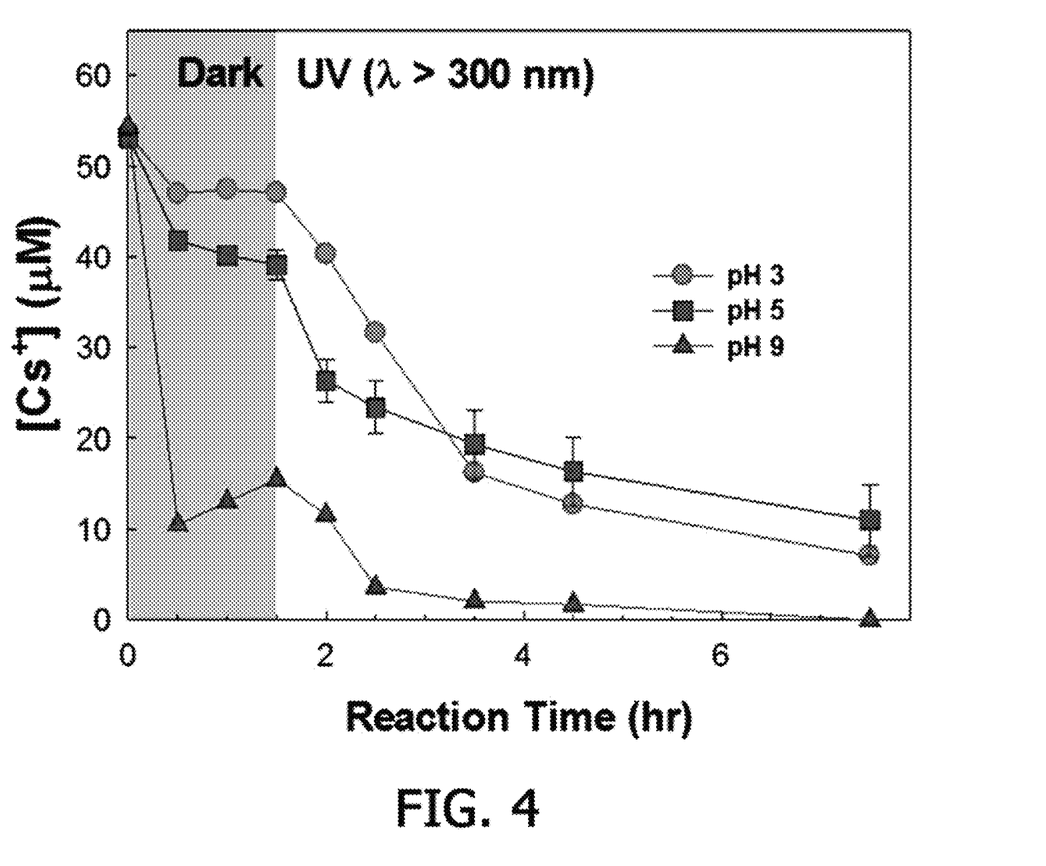
FIG. 4 is a graph showing the results of observing a change in Cs concentrations depending on pH values over time, in the Cs removal according to Example 1.

FIG. 4 is a graph showing the results of observing a change in Cs concentrations depending on pH values over time [not irradiated with external UV for 90 minutes, and then irradiated with external UV (amount of UV radiated per hour=3,000 $mJ/cm^2$)], in the Cs removal according to Example 1 (concentration of sample in aqueous precursor solution=5 g/L).

As shown in FIG. 4, regardless of pH conditions, the degree of Cs removal by external UV radiation is significant under all conditions. In the case of pH 3, when not irradiated with external UV, the degree of Cs removal is insignificant, but the degree of Cs removal by external UV radiation is significant.

Figure 5A:
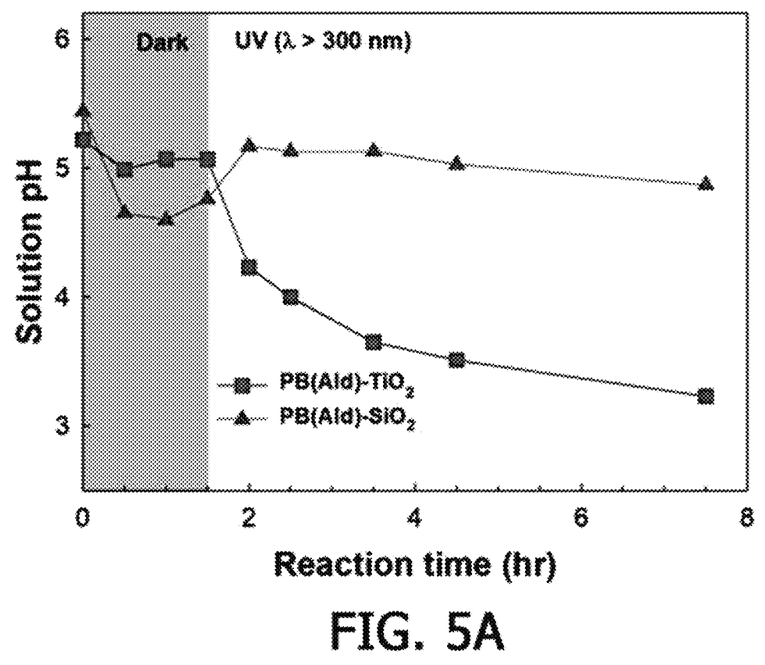
FIG. 5A is a graph showing the results of observing pH changes over times, in the Cs removal according to Example 1 and Comparative Example 1.
Figure 5B:
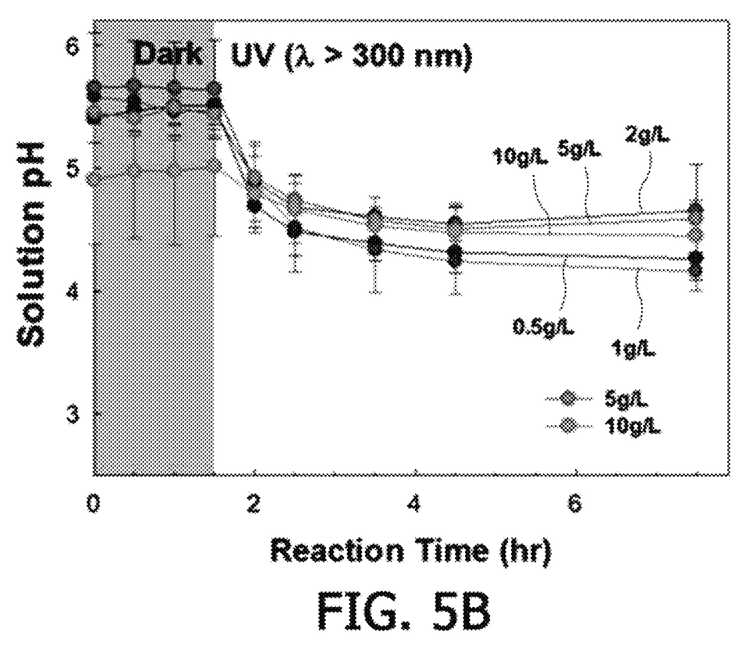
FIG. 5B is a graph showing the results of observing pH changes depending on the concentrations of samples in an aqueous precursor solution over time, in the Cs experiment according to Example 1.

FIG. 5A is a graph showing the results of observing pH changes over time [not irradiated with external UV for 90 minutes, and then irradiated with external UV (amount of UV radiated per hour=3,000 $mJ/cm^2$)], in the Cs removal according to Example 1 and Comparative 1 (concentration of sample in aqueous precursor solution=5 g/L).

As shown in FIG. 5A, compared to Comparative Example 1, in the case of Example 1, when not irradiated with external UV, pH changes are insignificant. However, as external UV radiation time increases, the pH level is gradually decreased. These results suggest that $TiO_2$ corresponding to the photocatalyst particles is activated by external UV radiation to form hydrogen ions but $SiO_2$ not corresponding to the photocatalyst particles is not activated.

FIG. 5B is a graph showing the results of observing pH changes depending on the concentrations of samples in an aqueous precursor solution over time [not irradiated with external UV for 90 minutes, and then irradiated with external UV (amount of UV radiated per hour=3,000 $mJ/cm^2$)], in the Cs removal according to Example 1 (concentration of sample in aqueous precursor solution=5 g/L).

As shown in FIG. 5B, regardless of the concentrations of the samples in the aqueous precursor solution, when not irradiated with external UV, pH changes are insignificant. However, as external UV radiation time increases, pH levels are gradually decreased. These results suggest that $TiO_2$ corresponding to the photocatalyst particles is activated by external UV radiation to form hydrogen ions but $SiO_2$ not corresponding to the photocatalyst particles is not activated.

Experimental Example 3: Degree of Cs Removal Depending on Kinds of Competitive Ions In the Cs removal according to Example 1 (concentration of sample in aqueous precursor solution=5 g/L), experiments were conducted to determine the degree of Cs removal depending on the kinds of competitive ions. The obtained results are shown in FIG. 6.

Figure 6:
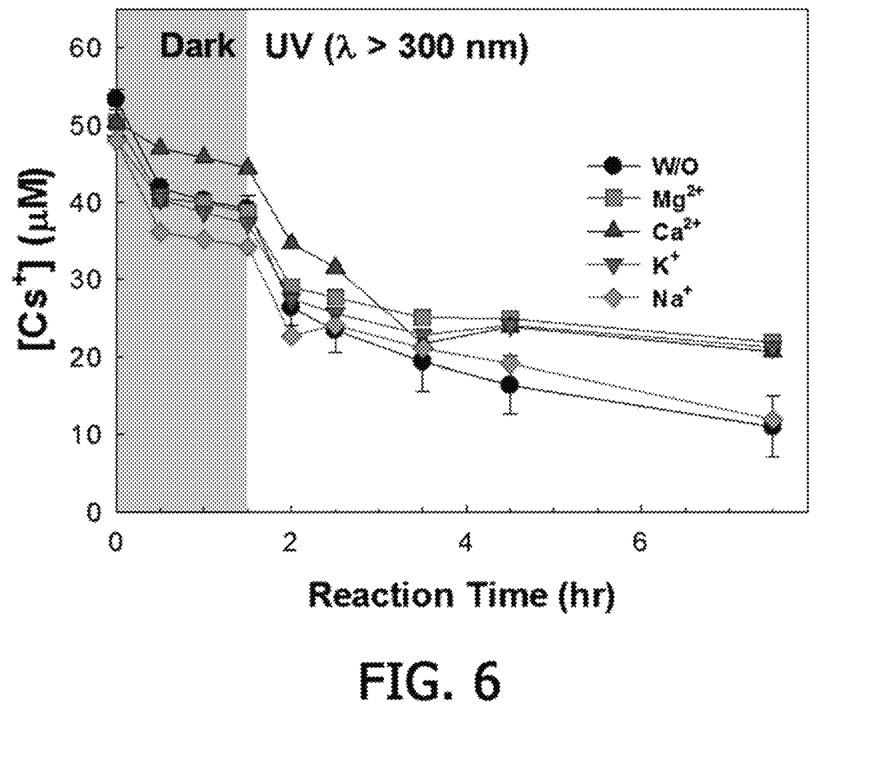
FIG. 6 is a graph showing the results of observing a change in Cs concentrations depending on the kinds of competitive ions over time, in the Cs removal according to Example 1.

FIG. 6 is a graph showing the results of observing a change in Cs concentrations depending on the kinds of competitive ions ($Mg^{2+}$, $Ca^{2+}$, $K^+$, and $Na^+$) over time [not irradiated with external UV for 90 minutes, and then irradiated with external UV (amount of UV radiated per hour=3,000 $mJ/cm^2$)], in the Cs removal according to Example 1.

As shown in FIG. 6, regardless of the kinds of competitive ions, when not irradiated with external UV, an insignificant difference in the degree of Cs removal is observed. However, as external UV radiation time increases, the degree of Cs removal is significantly increased. These results show that Cs is selectively removed depending on the kinds of competitive ions.

Experimental Example 4: Degree of Cs Removal Depending on Atmospheric Conditions In the Cs removal according to Example 1, experiments were conducted to determine the degree of Cs removal depending on atmospheric conditions. The obtained results are shown in FIGS. 7A and 7B.

Figure 7A:
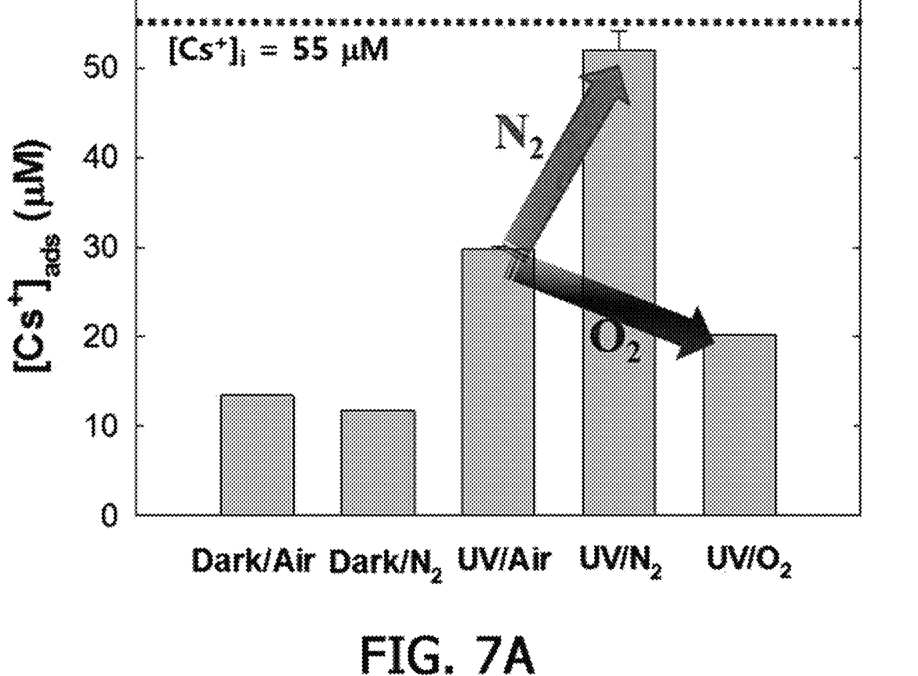
FIG. 7A is a graph showing the results of comparing Cs adsorption concentrations when not irradiated with external UV and Cs adsorption concentrations when irradiated with external UV for 3 hours depending on atmospheric conditions, in the Cs removal according to Example 1.

FIG. 7A is a graph showing the results of comparing Cs adsorption concentrations when not irradiated with external UV and Cs adsorption concentrations when irradiated with external UV for 3 hours (amount of UV radiated per hour=3,000 mJ/cm$^2$) depending on atmospheric conditions (air, nitrogen, and oxygen), in the Cs removal according to Example 1 (concentration of sample in aqueous precursor solution=5 g/L).

As shown in FIG. 7A, regardless of atmospheric conditions, when not irradiated with external UV, the Cs adsorption concentration is insignificant under all conditions. However, when irradiated with external UV radiation under a nitrogen atmosphere, the Cs adsorption concentration is significantly increased. In contrast, when irradiated with external UV radiation under an oxygen atmosphere, the Cs adsorption concentration is reduced.

Figure 7B:
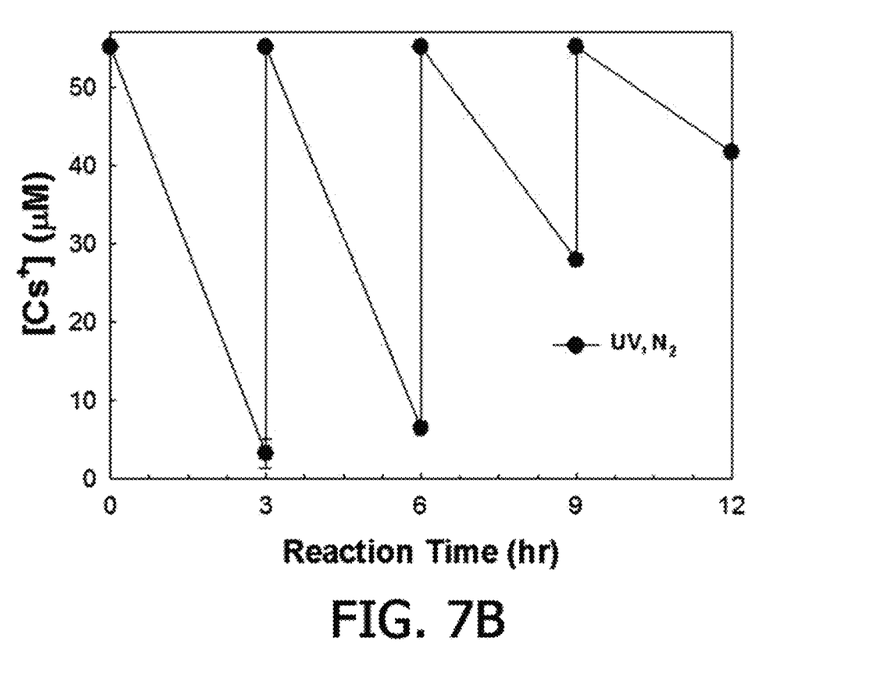
FIG. 7B is a graph showing the results of observing a change in Cs concentrations when irradiated with external UV for 3 hours under a nitrogen atmosphere (experiment was repeated 4 times), in the Cs removal according to Example 1.

FIG. 7B is a graph showing the results of observing a change in Cs concentrations when irradiated with external UV for 3 hours under a nitrogen atmosphere (amount of UV radiated per hour=3,000 mJ/cm$^2$) (experiment was repeated 4 times), in the Cs removal according to Example 1 (concentration of sample in aqueous precursor solution=5 g/L).

As shown in FIG. 7B, even when the same experiment is repeated four times, the degree of Cs removal by external UV radiation under a nitrogen atmosphere is excellent in all repeated experiments.

Experimental Example 5: Degree of Cs and $^{137}$Cs Removal Depending on Whether or not Photocatalyst Particles are Applied In the Cs and $^{137}$Cs removal according to Example 1 and Comparative Example 1, experiments were conducted to determine the degree of Cs and $^{137}$Cs removal depending on whether or not the photocatalyst particles are applied. The obtained results are shown in FIGS. 8A and 8B.

Figure 8A:
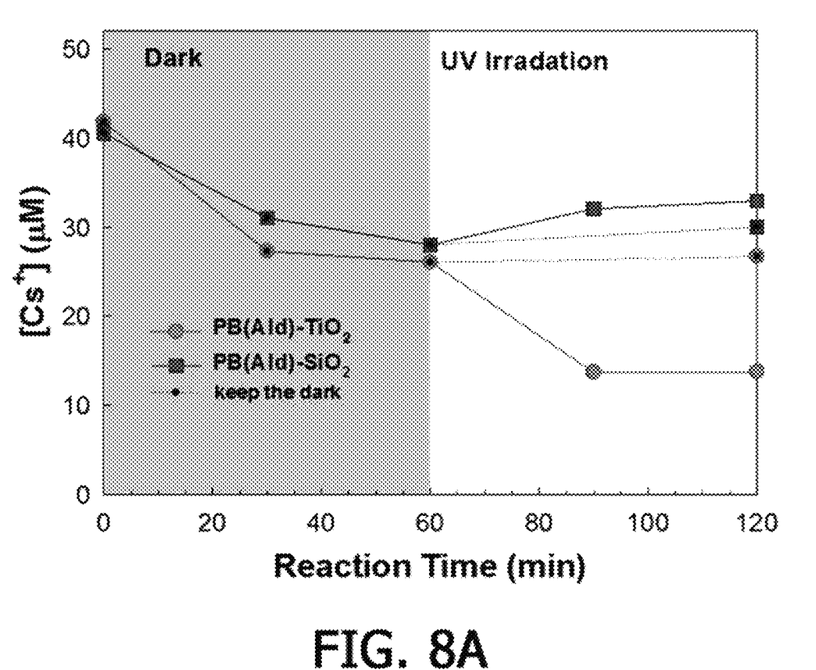
FIGS. 8A and 8B are graphs showing the results of observing changes in Cs and $^{137}Cs$ concentrations over time (not irradiated with external UV for 60 minutes, and then irradiated with external UV), in the Cs and $^{137}Cs$ removal according to Example 1 and Comparative Example 1.
Figure 8B:
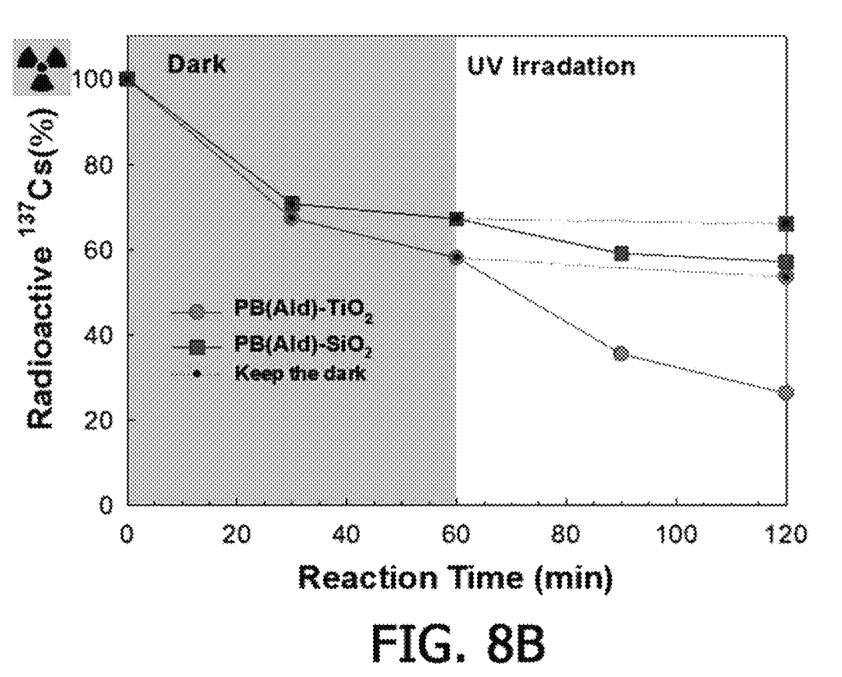

FIGS. 8A and 8B are graphs showing the results of observing changes in Cs and $^{137}$Cs concentrations over time [not irradiated with external UV for 60 minutes, and then irradiated with external UV (amount of UV radiated per hour=3,000 mJ/cm$^2$)], in the Cs and $^{137}$Cs removal according to Example 1 and Comparative Example 1 (concentration of sample in aqueous precursor solution=5 g/L).

As shown in FIGS. 8A and 8B, in the case of Example 1, when not irradiated with external UV, the degree of Cs and $^{137}$Cs removal is similar to that of Comparative Example 1. However, as external UV radiation time increases, the degree of Cs and $^{137}$Cs removal is significantly increased. These results suggest that TiO$_2$ corresponding to the photocatalyst particles is activated by external UV radiation to form hydrogen ions but SiO$_2$ not corresponding to the photocatalyst particles is not activated.

As described above, the radioactive cesium adsorbent according to the present disclosure includes photocatalyst particles and Prussian blue. The ferric ions of Prussian blue are reduced to ferrous ions by activation of the photocatalyst particles. Thus, the performance of Prussian blue can be improved, so that radioactive cesium can be effectively/selectively removed.

In particular, by optimizing external UV radiation conditions for activation of the photocatalyst particles, the performance of Prussian blue can be further improved, so that radioactive cesium can be more effectively/selectively removed.

According to the present disclosure, when the radioactive cesium adsorbent is used, the amount of secondary waste can be greatly reduced while radioactive cesium, which is regarded as a dangerous material in terms of radiation protection and environmental protection, is effectively removed. Therefore, the radioactive cesium adsorbent can be useful for decontamination or after accidents at nuclear facilities.

The aforementioned description of the present disclosure is provided by way of example and those skilled in the art will understood that the present disclosure can be easily changed or modified into other specified forms without change or modification of the technical spirit or essential characteristics of the present disclosure. Therefore, it should be understood that the aforementioned examples are only provided by way of example and not provided to limit the present disclosure.

What is claimed is:

1. A method of removing radioactive cesium, comprising:
preparing a composition comprising photocatalyst particles and Prussian blue;
mixing radioactive cesium and the composition to provide a precursor solution; and
applying UV light to the precursor solution under a nitrogen atmosphere to activate the photocatalyst particles for causing reduction of ferric ions of the Prussian blue to ferrous ions.

2. The method according to claim 1, wherein the photocatalyst particles and the Prussian blue contained in the precursor solution is 2 to 20 g/L.

3. The method according to claim 1, the UV light has a wavelength sufficient to activate the photocatalyst particles.

4. The method according to claim 3, wherein the wavelength is longer than 300 nm and shorter or equal to 500 nm.

5. The method according to claim 3, wherein the UV light is applied for 10 minutes to 10 hours, and application of the UV light per hour is 300 to 5,000 mJ/cm$^2$.

6. The method according to claim 5, wherein applying the UV light is performed at pH 2 to pH 10.

7. The method according to claim 1, wherein the photocatalyst particles comprise one or more selected from the group consisting of TiO$_2$, ZnO, WO$_3$ SnO$_2$, CdS, and Fe$_2$O$_3$.

8. The method according to claim 1, wherein the Prussian blue comprises a compound represented by Formula 1:

Formula 1

* * * * *